United States Patent
Ponomarev et al.

(10) Patent No.: US 8,742,001 B2
(45) Date of Patent: Jun. 3, 2014

(54) NANOCOMPOSITE MATERIAL CONTAINING POLYMER BINDERS

(75) Inventors: Andrey Nikolaevich Ponomarev, St. Petersburg (RU); Olga Meza, Stockholm (SE)

(73) Assignee: Virtum i Sverige AB, Stockholm (SE)

( * ) Notice: Subject to any disclaimer, the term of this patent is extended or adjusted under 35 U.S.C. 154(b) by 251 days.

(21) Appl. No.: 13/388,182

(22) PCT Filed: Oct. 22, 2009

(86) PCT No.: PCT/RU2009/000563
§ 371 (c)(1),
(2), (4) Date: Jan. 31, 2012

(87) PCT Pub. No.: WO2011/010948
PCT Pub. Date: Jan. 27, 2011

(65) Prior Publication Data
US 2012/0142821 A1  Jun. 7, 2012

(30) Foreign Application Priority Data

Jul. 21, 2009  (RU) ............... 2009/000364

(51) Int. Cl.
*C08K 3/04* (2006.01)
*C01B 31/02* (2006.01)

(52) U.S. Cl.
CPC .............. *C08K 3/04* (2013.01); *C01B 31/0213* (2013.01); *C08K 2003/045* (2013.01); *C08K 2201/004* (2013.01); *C08K 2201/011* (2013.01); *C08K 2201/014* (2013.01)
USPC .......................................... 524/496; 524/495

(58) Field of Classification Search
CPC ................. C08K 3/04; C08K 2003/04; C08K 2003/045; C08K 2201/003; C08K 2201/004; C08K 2201/011; C08K 2201/014; C01B 31/0213

USPC .................................................. 524/495, 496
See application file for complete search history.

(56) References Cited

U.S. PATENT DOCUMENTS

| 5,464,987 A | 11/1995 | Ihara et al. |
| 2003/0082092 A1* | 5/2003 | Nettleton ................... 423/447.2 |
| 2006/0155376 A1 | 7/2006 | Asgari |
| 2011/0027599 A1 | 2/2011 | Hoek et al. |

FOREIGN PATENT DOCUMENTS

| CN | 101098916 A | 1/2008 |
| CN | 101137427 A | 3/2008 |
| RU | 2 196 731 C2 | 1/2003 |
| RU | 2 223 304 C1 | 2/2004 |
| RU | 2 223 988 C2 | 2/2004 |
| RU | 2 354 526 c2 | 9/2008 |

OTHER PUBLICATIONS

Lian et al., "The Transformation of acetylene black into onion-like hollow carbon nanoparticles at 1000° C. using an iron catalyst", Carbon, vol. 46, Issue 3, Jan. 8, 2008, pp. 525-530.

* cited by examiner

*Primary Examiner* — Vickey Nerangis
(74) *Attorney, Agent, or Firm* — Renner, Otto, Boisselle & Sklar, LLP

(57) ABSTRACT

The invention relates to a nanocomposite material that contains a polymer binder, a filler and a fraction of nanoparticles, characterized in that the fraction of nanoparticles comprises multi-layered carbon particles having a toroid-like shape with a size of 15 to 150 nm, wherein the ratio between the outer diameter and the thickness of the toroid body is in a range of (10-3):1. This nano-modification makes it possible to obtain an efficient compaction and hardening of the nanocomposite material close to the filler/binder inter-phase barrier, and accordingly to increase the average density, elasticity, hardness and resistance of the material. The invention can be used for making various parts and articles for use in mechanical engineering and transport, including instrument holders for the precise surface treatment of parts.

14 Claims, No Drawings

NANOCOMPOSITE MATERIAL CONTAINING POLYMER BINDERS

FIELD OF INVENTION

Presented invention belongs to the field of polymer composite materials containing polymer-bound filling material. Such material may have engineering purpose and be used for producing of various details and articles in machine-building and transport including tool holders for precision machining of workpiece surfaces.

PREVIOUS LEVEL OF ENGINEERING

The polymer composite materials are the multi-components consist of polymer base (matrix) reinforced with fillers of fibers, filamentary crystals, fine particles, etc. By choosing a makeup and properties of the filler and the matrix (a binder), their ratio, orientation of the filler, one can obtain materials with the required operational and processing characteristic combinations.

It is known that a lot of polymer parameters can be improved by means of their modification by applying of small additives of nanoparticles.

Small fullerene additives are known to modify considerably operational characteristics of polymer materials more often increasing their mechanical properties, heat resistance, electric conductivity, antifriction parameters, etc. Small additives of nanotubes increase elastic modulus and breaking strength of polymers.

It is also known that fine carbon additives are to be additionally mixed in in polymer binder content in order to increase mechanical strength of polymer composite materials based on filler and polymer binder. Among those are such additives as carbon black, fullerenes, and carbon nanotubes and carbon nanoparticles.

This type of compositional materials is called "nanocomposites".

The known nanocomposite material is based on the medium strengthened with a polymer binder. It contains nanofractions including polyhedral multi-layered carbon nanostructures of fulleroid type (RU 2354526, RU 2223988).

For the first time such fulleroid type multi-layered carbon nanostructures of fulleroid type were described in RU 2196731. Later they were called astralenes (See RU 2291700). However, materials described in RU 2354526 and RU 2223988 do not permit to achieve sufficient density of a polymer matrix and provide composition material elastic modulus over 500 GPa, which is often desirable. It is also desirable to increase composite rigidity and strength.

ESSENCE OF INVENTION

Object of this invention is to create a new composite material with improved mechanical properties, namely higher elasticity, rigidity and strength.

This task is solved by proposing of nanocomposite material which contains polymer binder, filler and nanoparticle fraction. This material differs by the fact that the nanoparticle fraction includes multi-layer toroid-shaped carbon particles with the size from 15 to 150 nm with its outer diameter/torus body thickness ratio being within (10-3):1 limits.

Adding of such modified additive permits to obtain nanocomposite material effective compression and strengthening close to the filler/binder interphase borders, thus increasing it average density, elasticity, rigidity and strength.

Indicated toroid-shaped carbon particles are preferably to be of fulleroid type. The inter-layer space in these particles is equal to 0.34-0.36 nm.

It is expedient when indicated toroid-shaped appears to be those particles from cathode deposit crust resulted by graphite anode evaporation in electric arc process and subjected to gas-phase oxidation, which are prone to electric field influence.

As preferable for production method with crust granulation before oxidation, gas-phase oxidation is to be performed in SHF field. Moreover, after gas-phase oxidation been carried out and before testing on electric field influence susceptibility. it is possible to perform additional liquid-phase oxidation. This described method permits obtaining particles with necessary characteristics.

The nanoparticle fraction in the proposed composite material may additionally contain carbon nanotubes.

These carbon nanotubes/specified carbon nanoparticles ratio may be from 1:10 to 10:1.

The nanoparticle fraction in the proposed composite material may additionally include fullerenes.

Fullerenes/specified nanoparticle ratio may be from 1:10 to 1:10000.

Fullerenes may be fullerenes of C-60, C-70, C-76, C-78, C-84 type. It is possible to use mix of fullerenes, as well as the compound of fullerenes and carbon nanotubes.

If fullerenes and nanotubes are not included in nanoparticle fractions, it is expedient these multi-layer toroid-shaped carbon nanoparticles to form at least 5% of fraction mass. At the same time, the other part of the fraction can be presented, for example, by polyhedral nanoparticles.

Such quantity of the toroid-shaped carbon nanoparticles is sufficient to provide necessary technical effect.

It is advisable that nanoparticle fraction in the proposed nanocomposite material is presented in the quantity of 25% of polymer binder mass. At the same time, the desirable effect is obtained, when such particles present in amount of 0.02% of binder mass.

Carbon filler is to be a carbon fiber in the preferable embodiment of invention.

DETAILED DESCRIPTION OF THE INVENTION

The present invention is characterized by the fact that the polymer composite nanofraction includes multi-layer carbon nanoparticles of toroid shaped form (MNTF).

By definition, a toroid is a body obtained by rotation of circle about axis laying in it's plane. Although a sphere represents a particular case of the toroid, the outer diameter/torus body thickness ratio indicated for particles in our invention excludes spherical particles. As per invention, particles, with maintenance of indicated outer diameter/toroid body thickness ratio, can be presented by irregular toroids with polygonal line as outer plane projection boundary.

According to the invention, the structure of particles can be similar to multi-layer nanotubes, which are closed without any free ends remaining.

Unit particle layer can have a fulleroid structure, i.e. to represent continuous set of five- and six-membered rings with alternate σ and π bonds. However, the applicant has determined that technical result is not so much achieved due to such layer nature as, mainly, due to nanoparticle shape.

The applicant has discovered that MNTF have an unexpected ability to increase the average density of materials. It was probably due to a very high dispersive interaction with the reinforced filler (in particular, with carbon fibers) and supermolecular features in a polymeric matrix.

Thus, the technical result consists in compressing of material close to interphase boundaries, increasing of nanocomposite material average density, its rigidity and strength and extending of active life of products made of such material, is achieved MNTF may have various geometric parameters, for example, outer diameter/toroid body thickness ratio. The indicated parameters can be measured by transmission electron microscope or obtained out of the X-ray diffraction analysis results.

The applicant has established that the particles, which outer diameter/torus body thickness ratio is within the limits of (10-3):1, provide achievement of the specified technical result. Moreover, the ratio (5-4):1 is more preferable, but the most favorable ratio is the 4.5:1.

According to the invention, admission of toroid-shaped particles can be performed additionally to the known composite material modification by fullerenes and nanotubes. Admission of nanotubes by itself provides polymer increase of binder rigidity, and simultaneous additional modification with NMTF provides nanotubes cross-linking with an unexpected increase of binder rigidity and strength, which could never seemed to achieve earlier.

Fibrous, laminated and dispersed materials can be used as filler in composite material. Glass, carbon, organic, and boron fibers are suitable for reinforcement. The carbon fiber is used mainly as it permits obtaining the most solid material.

The use of carbon fibers is a routine technology to increase durability of plastic compositions. The parameters determining effectiveness of strengthening of such compositions appear to be fiber tear strength, its length/diameter ratio and its binding deformation ability.

At the same time it is clear that carbon nanotubes appear to be a good reinforcement, as they have high rupture strength and bigger length/diameter ratio. However, the slippage of one wall relatively to another is observed with the carbon nanotubes, thus, reducing actually attainable strength values. Atomic-smooth nano-tube surfaces result in their weak cohesion with reinforcing material.

MNTF introduction in composite material content results in increasing of nanotubes/reinforcing material cohesion. Evidently, it takes place due to strong dispersing influence of toroid-shaped particles.

Admission of fullerenes is known to improve surface properties of a polymer binder. Combined with MNTF admission it results in synergic improvement of interfacial interaction in the nanocomposite material.

MNTF is produced from a crust of the cathode deposit obtained by thermal or plasma dispersion of graphite anode in conditions of DC passing in-between the anode and cathode in inert gas medium. It is educed from the lump of carbon nanoparticles obtained, for example, with the help of the successive oxidation method and its further division during electrodes power interaction in the field emission process from carbonic cathodes.

The cathode deposit can be produced with the help of electroarc erosion of the anode graphite rod with 30-160 mm$^2$ profile and 80-200 A/cm$^2$ current density, as well as the arc-drop voltage of 20-28 V in helium medium at 40-100 torr pressure (for example, as it is described in Patent RU2196731, 2000).

For further processing, the dense crust of cathode deposit is chosen. It is separated from its friable middle and reduced to fragments.

The applicant researched polyhedral multi-layered carbon nanostructures of fulleroid type obtained according to RU 2196731. They were polyhedrons with inner cavity. They can also have branched appearance without containing any inner cavity or to have shape of a flattened polyhedron.

According to the invention under consideration, the gas-phase oxidation, especially the oxidation in SHF-field permits opening effectively the inner cavities obtaining toroid-shaped structure.

The oxidation is carried out in SHF-field, for example, in the field having 2.5 GHz frequency and 500-1500 watt power. The ground cathode deposit is placed in rotating quartz tube before putting it in SHF-field. Such gas-phase oxidation is carried out for 100-150 min.

After the gas-phase oxidation, the obtained product can be additionally subjected to electrochemical oxidation.

Also, after the gas-phase and/or electrochemical oxidation, the obtained product can be placed in liquid gas medium (nitrogen, helium).

After the division using power electrode interaction is over, the product obtained at anode is collected and placed in organic solvent.

To determine the main physical parameters, the product can be separated from the solvent and subjected to X-ray research, as well as with the help of a transmission electron microscope, for example, JEM-100C Model.

Size, form and outer diameters ratio of toroid-shaped nanoparticles and their multi-layer body thickness are determined using standard samples of the latex spheres.

Fullerenes and nanotubes can be obtained in the way described, for example, in Patent [RU2234457, 2001]. They are also sold under the trade mark, for example, "Fullerenes" and "Townit".

Straight filaments with the diameter from 1 to 500 microns are used as carbon fiber. It can be, for example, carbon fiber of unidirectional fabric composition. In particular, the filament unidirectional fabric is used consisting of a number of carbon fibers. The fibers are laced parallel to each other on one plane and fixed across with glass threads, for example, carbonic unidirectional fabric of YSH-60A Type produced by NIPPON GRAPHITE FIBER Corp. (Japan).

Epoxy-diane or epoxy-novolac resins of DER 330, DR-531, DR-440, EHD, EFNB, VS-2526, epoxy-phenolic resins, for example, SF-10 Type, polyesters, imidazole binders, such as polyimidazole and polyoxybenzimidazole, etc., can be used as polymer binders.

Component ratio in a composite material is 50-90% of carbon fiber mass and 10-50% of polymer binder mass.

Nanocomposite material can be produced as follows: MNTF and their mixtures with nanotubes and fullerenes are mixed in the quantity of 0.1%-50% of binder mass into liquid resin or into binder hardening component mixing with the help of an ultrasonic homogenizer. This is the way the additive concentrate is obtained.

Then the concentrate is mechanically mixed in the binder mass. The carbon fiber in the form of straight filaments is saturated with binding immersion into a tank with the binder. Then the substance is pressed with its simultaneous thermo treatment or it is passed through draw plates and forms the nano-composite material using the pultrusion method. If the fullerenes are mixed in, the carbon fiber is passed through the tank filled with fullerene solution, for example, aromatic hydrocarbons, etc. before it is saturated with a binder.

Example 1

Obtaining Toroid-Shaped Carbon Nanoparticles

The cathode deposite is obtained using electroarc erosion of the anode graphite rod with 100 mm$^2$ section and 200

A/cm² current density and 24V arc voltage drop in helium medium with 70 torr pressure. The dense crust of cathode deposit is separated from the loose middle part, reduced to powder fragments with 200-800 nm average dispersity and placed into a rotating quartz tube in SHF field with 2.5 GHz frequency and 1000 Wt power.

After the gas-phase oxidation under stated conditions within 100 min obtained powder is to be cooled down and placed in vacuum-type capacity on the negative electrode in cathode/anode inter-electrode gap. Then cathode/anode potential difference is increased until appearance of field-emission current. When the filed-emission current is increased, a part of multi-layered carbon nanoparticles shifts to a positive electrode. After the process is over, they are collected from anode surface and converted into dispersion in dimethylformamide Example 2

Obtaining Toroid-Shaped Carbon Nanoparticles

The product is obtained in the same way as in Example 1, but gas-phase oxidation is going in the medium containing increased oxygen quantity, for example from 20% to 60%.

Example 3

Obtaining Toroid-Shaped Carbon Nanoparticles

The product is obtained in the same way as in Example 1, but after gas-phase oxidation, multi-layer carbon nanoparticles are additionally electrochemically oxidized in water electrolyte containing chlorine compound solution.

Example 4

Obtaining Toroid-Shaped Carbon Nanoparticles

The product is obtained in the same way as in Example 1, but toroid-shaped multi-layered carbon nanoparticles are produced in electric fields of dielectric medium with high dielectric penetration values (for example, in white-spirit).

Example 5

Obtaining Toroid-Shaped Carbon Nanoparticles

The product is obtained the same way as in Example 1, but after gas-phase oxidation, the multi-layered carbon nanoparticles are additionally cooled by placing in liquid nitrogen medium and sparged. The deposit is separated further by a liquid phase followed by evaporation of liquid nitrogen and two types of carbon powder are obtained and further processed in a way described in Example 1.

Example 6

Obtaining a Product of Comparison

The cathode deposit is obtained with electric arc erosion of anode graphite rod with 100 mm² section with a graphite cathode of the same section at 200 A/cm² current density and 24V arc voltage drop in helium medium (with 70 torr pressure. The deposit appears to be fringed tubular pattern of ab. 120-mm length and ab. 35 mm diameter with heterogeneous incoherent core density and dense layer (crust) with 9-10 mm inner diameter and ab. 2 mm thickness.

The crust is to be separated and granulated to powder with 200-800 nm average fineness. The powder is to be mixed with 5 mass % of dispersed potassium nitrate and placed in a rotating tube furnace for gas-phase oxidation at 600° C.

After the gas-phase oxidation, powder is separated with the help of electric flotation selecting the emerged fraction with 100-300 nm fineness. Selected fraction is dried, mixed with 5 mass % of dry fine-dispersed potassium nitrate and placed in potassium hydroxide hot melt, where it is subjected to liquid-phase oxidation at 500° C.

The hot melt is cooled down and diluted in water. The fine-dispersed product is separated with the help of electric flotation, neutralized with acid and thoroughly rinsed with distilled water in a filter and converted into dispersion in dimethylformamide.

Example 7

Preparing the Composite Material

Multi-layered carbon nanoparticles in Examples 1-6 are compounded in quantity of 50% of their mass into a binding liquid resin and mixed with the help of ultrasonic homogenizer. Then, the obtained concentrate is mechanically mixed in binding mass reaching 0.02% nanoparticles content. The carbon fiber is in the form of straight filaments, which is a carbon unidirectional fabric of YSH-60A Type produced by NIPPON GRAPHITE FIBER Corp. (Japan). The glass threads are to be preliminary removed from the carbon fiber and it is saturated with a binding substance by means of immersing it into a tank filled with binder. After that it is to be pressed with simultaneous thermal treatment.

Example 8

Preparing a Composite Material

As in Example 7, just carbon fiber is treated in a tank filled with fullerene solution in toluene before its saturation.

Example 9

Preparing a Composite Material

As in Example 7, but there are some nanotubes added in binding substances.

With the methods presented in Examples 7-9, there were developed seven composite materials. For the materials indicated there were determined density, elasticity module and strength. The results are presented below in Table 1.

TABLE 1

Physical and mechanical properties of nanocomposite material (NM)

| No.: 1 | Material name and composition 2 | Density, gr/cm³ 3 | Strength, MPa 4 | Elasticity module, GPa 5 | Method of example 6 |
|---|---|---|---|---|---|
| 1. | NM based on YSH-60A fabric with 5% polyhedral nano-structures relative to binder mass | 2.06 | 4100 | 640 | 7 |
| 2. | NM based on YSH-60A fabric with | 2.06 | 4150 | 650 | 7 |

TABLE 1-continued

Physical and mechanical properties of nanocomposite material (NM)

| No.: 1 | Material name and composition 2 | Density, gr/cm³ 3 | Strength, MPa 4 | Elasticity module, GPa 5 | Method of example 6 |
|---|---|---|---|---|---|
|  | 0.02% MNTF relative to binder mass |  |  |  |  |
| 3. | NM based on YSH-60A fabric with 25% MNTF relative to binder mass | 2.12 | 4200 | 680 | 7 |
| 4. | NM based on YSH-60A fabric with 5% MNTF and 5% of carbonic nanotubes relative to binder mass (ratio 1:1) | 2.1 | 4300 | 690 | 9 |
| 5. | NM based on YSH-60A fabric with 0.5% MNTF and 5% carbonic nanotubes relative to binder mass (ratio 1:10) | 2.07 | 4200 | 655 | 9 |
| 6 | NM based on YSH-60A fabric with 10% MNTF and 2% fullerenes relative to binder mass (ratio 5:1) | 2.11 | 4250 | 685 | 8 |
| 7 | NM based on YSH-60A fabric with 10% MNTF and 0.001% fullerenes relative to binder mass (ratio 10000:1) | 2.09 | 4200 | 660 | 8 |

Physical and mechanical parameters of the nanocomposite material produced on the basis of the same carbon fiber, but without adding of MNTF, are presented in Table 1 for the comparison.

As it is shown in the Table, presented nanocomposite material has higher density, higher elasticity module determining rigidity than the nanocomposite material containing no MNTF.

The invention claimed is:

1. Nanocomposite material containing polymer binder, filler and nanoparticle fraction wherein the fraction of nanoparticles includes multi-layered carbon toroid-shaped particles with the size from 15 to 150 nm with outer diameter/toroid body thickness ratio within the bounds of (10-3):1, wherein the indicated toroid-shaped particles constitute, at least, 5% of nanoparticles fraction mass excluding fullerenes and nanotubes mass if they are present.

2. Nanocomposite material as set forth in claim 1, wherein indicated above carbon toroid-shaped particles are of fulleroid structure.

3. Nanocomposite material as set forth in claim 1, wherein the inter-layer spacing inside the indicated toroid-shaped particles is equal to 0.34-0.36 nm.

4. Nanocomposite material as set forth in claim 1, wherein the indicated toroid-shaped particles are those parts of cathode deposit crust which were obtained by graphite anode evaporation in arc process and subjected to gas-phase oxidation prone to electric field effect.

5. Nanocomposite material as set forth in claim 4, wherein the crust before its oxidation is granulated.

6. Nanocomposite material as set forth in claim 4, wherein the gas-phase oxidation is carried out in SHF field.

7. Nanocomposite material as set forth in claim 5, wherein liquid-phase oxidation goes additionally after the gas-phase oxidation before testing for electric field exposure.

8. Nanocomposite material as set forth in claim 1, wherein carbon nanotubes are additionally included into the fraction of nanoparticles.

9. Nanocomposite material as set forth in claim 8, wherein the carbonic nanotubes/indicated carbon nanoparticles ratio is from 1:10 to 10:1.

10. Nanocomposite material as set forth in claim 1, wherein the fraction of nanoparticles additionally includes fullerenes.

11. Nanocomposite material as set forth in claim 10, wherein the fullerenes/indicated nanoparticles ratio is from 1:10 to 1:10000.

12. Nanocomposite material as set forth in claim 1, wherein the indicated fraction of nanoparticles is present in the quantity up to 25% of polymeric binding mass.

13. Nanocomposite material as set forth in claim 1, wherein the filler is carbon.

14. Nanocomposite material as set forth in claim 1, wherein the filler is carbon fiber.

* * * * *